(12) United States Patent
Rink et al.

(10) Patent No.: US 9,884,610 B2
(45) Date of Patent: Feb. 6, 2018

(54) LOCKING MECHANISM FOR A BELT RETRACTOR

(71) Applicant: TRW Automotive GmbH, Alfdorf (DE)

(72) Inventors: Jürgen Rink, Waldstetten (DE); Verena Scheumann, Plochingen (DE); Brigitte Senber, Obergroningen (DE); Markus Dauber, Bartenbach (DE); Thomas Kielwein, Eschach (DE); Boris Siebeck, Schwäbisch Gmünd (DE); Alexander Steidle, Heubach (DE)

(73) Assignee: TRW Automotive GmbH (DE)

( * ) Notice: Subject to any disclaimer, the term of this patent is extended or adjusted under 35 U.S.C. 154(b) by 212 days.

(21) Appl. No.: 14/428,110

(22) PCT Filed: Sep. 16, 2013

(86) PCT No.: PCT/EP2013/002783
§ 371 (c)(1),
(2) Date: Mar. 13, 2015

(87) PCT Pub. No.: WO2014/040748
PCT Pub. Date: Mar. 20, 2014

(65) Prior Publication Data
US 2016/0031412 A1  Feb. 4, 2016

(30) Foreign Application Priority Data
Sep. 17, 2012 (DE) ........................ 10 2012 018 262

(51) Int. Cl.
*B60R 22/38* (2006.01)
(52) U.S. Cl.
CPC ................................... *B60R 22/38* (2013.01)
(58) Field of Classification Search
CPC ...................................................... B60R 22/38
See application file for complete search history.

(56) References Cited

U.S. PATENT DOCUMENTS 5,375,787 A * 12/1994 Fujimura .............. B60R 22/405
                                                            242/383.2
2013/0181430 A1    7/2013 Bosse et al.

FOREIGN PATENT DOCUMENTS

DE    102010025233 A1 * 12/2011 ............ B60R 22/38
WO    2012/041443         4/2012

OTHER PUBLICATIONS

Article entitled "Optimum Stiffener Layout for the Reduction of Vibration and Noise of Gearbox Housing", vol. 124, pp. 518-512, Sep. 2002.

* cited by examiner

*Primary Examiner* — Faye M Fleming
(74) *Attorney, Agent, or Firm* — Tarolli, Sundheim, Covell & Tummino LLP

(57) ABSTRACT

A looking mechanism (12) for a bolt retractor (10) including an inertia element (24) which is supported to be rotatable between a home position and a locked position in a bearing (28), the bearing (29) being a conical bearing.

15 Claims, 2 Drawing Sheets

LOCKING MECHANISM FOR A BELT RETRACTOR

RELATED APPLICATIONS

This application corresponds to PCT/EP20131002783, filed Sep. 16, 2013, which claims the benefit of German Application No. 10 2012 018 262.7. filed Sep. 17, 2012, the subject matter, of which are incorporated herein by reference in their entirety.

BACKGROUND OF THE INVENTION

The invention relates to a locking mechanism for a belt retractor comprising an inertia element supported in a bearing to be rotatable between a home position and a locked position.

A belt retractor is used to protect a vehicle occupant by means of a seat belt. The seat belt is wound onto a belt reel from which it can be extended. In the case of need, for example with extreme vehicle deceleration, the belt reel is blocked to be rotationally fixed in the unwinding direction of the seat belt so that no further seat belt can be extended. Hence a vehicle occupant buckled with the seat belt takes part in the vehicle deceleration. For blocking the belt reel, the belt reel can have a toothing which does not obstruct rotation of the belt reel during normal operation. In the case of need, the belt reel is transferred to a blocking position in which the toothing of the belt reel engages in one or more recesses at the frame of the belt retractor. In the blocking position the belt reel is thus retained to be rotationally fixed against rotation in the unwinding direction of the seat belt.

For transferring the belt reel from the idle position into the blocking position the locking mechanism is used. The locking mechanism usually includes an inertia element which during normal operation can follow the rotation of the belt reel. In a home position the inertia element is biased by means of a spring in the direction of rotation and is pivoted to a bearing point so that, in the case of need, by a faster webbing extension due to the forward displacement of the occupant with great vehicle decelerations the inertia element is deflected, due to its inertia, about the bearing point into a locked position. The inertia element includes a ratchet which is inserted into the toothing of the belt retractor frame by the afore-described process in the case of need. In order to realize the pivoting motion of the inertia element, the latter is typically arranged on a cylindrical bearing point of the reel.

The drawback with this support of the inertia element is that the contact point between the bearing point and the inertia element migrates depending on the rotary position of the belt reel, as tolerances are provided between the inertia element and the bearing point. This migration of the contact point is due to gravity, as the belt reel, and related thereto the contact point between the bearing point and the inertia element, is vertically arranged. Depending on the rotary position, the contact point thus migrates depending on the position of the inertia element relative to the entire belt reel. At a "6 o'clock" position the inertia element is provided, for example, in the lower area of the belt reel, and the contact point of the inertia element at the bearing point is provided at a side facing the central axis of the belt reel. When the belt reel is rotated about 180° during normal operation, the inertia element is provided at a "12 o'clock" position, i.e. in the upper area of the belt reel. The contact point between the inertia element and the bearing point is then located on a side facing away from the central axis of the belt reel, because due to gravity the inertia element "rests" on the bearing point. By reason of this migration of the contact point, the position of the inertia element relative to the belt reel will influence the insertion of the belt reel. Moreover, friction occur by reason of the migration of the contact point, thereby the components being subjected to wear.

SUMMARY OF THE INVENTION

Accordingly, it is the object of the invention to further develop a locking mechanism of the type mentioned in the beginning to the effect that a locking mechanism ensuring insertion of the belt reel independent of the mass of the inertia element is provided.

For achieving this object, there is provided a locking mechanism for a belt retractor comprising an inertia element which is supported to be rotatable between a home position and a locked position in a bearing. In accordance with the invention, it is provided to employ a conical bearing, thereby a point-shaped contact point of the inertia element and the bearing point being created. This point-shaped support ensures insertion of the belt reel independent of the mass of the inertia element. Since due to the conical bearing a constantly centrical orientation of the inertia element with respect to the belt reel is guaranteed, the contact point of the bearing and of the inertia element does not migrate, thereby the effect of the inertia mass on the insertion of the belt reel being eliminated. A further advantage is resulting from the fact that the configuration of the bearing as point-shaped bearing exhibits especially low friction. This entails advantages regarding the stability of the components.

In a preferred embodiment furthermore a spring element is provided for loading the inertia element against a support surface. Since the inertia element is loaded by the spring element, the inertia element is supported free from axial play, which results in higher stability and better noise behavior as no axial relative movement can occur between the inertia element and the bearing point.

Preferably, there is moreover provided a coupling disk on which the spring element is arranged. With the function of the locking mechanism of the belt retractor the coupling disk serves as control element for blocking the belt retractor.

In particular, the spring element can be formed integrally with the coupling disk. This means that the spring element is part of the coupling disk, whereby the stability is increased and the assembly of the belt retractor is facilitated during manufacture, because no additional fastening means for the spring element have to be provided. In addition, no tolerances influencing the inserting accuracy will occur due to the integral design of the spring element with the coupling disk.

In an especially preferred embodiment, between the inertia element and the spring element a point-shaped pressing surface is provided. Similarly to the conical support of the inertia element, a low-friction bearing is obtained on the bearing point by the point-shaped pressing surface, thereby the long life of the elements being ensured. Moreover, the centric support of the inertia element already present by the conical support is intensified by the point-shaped pressing surface between the inertia element and the spring element.

Preferably the bearing point is located in the center of mass of the inertia element. This offers the advantage that the risk of a tilting of the inertia element is minimized.

In particular, the conical bearing may include a bearing pin. This means that the support of the inertia element in the center of mass can be guaranteed, as the inertia element rests on the bearing pin protruding into the inertia element.

In one embodiment the conical bearing includes a convex support surface interacting with a concave bearing surface on the inertia element. By the contact surfaces configured in this way, the convex support surface and the concave bearing surface, the conical bearing having a point-shaped contact point is created. The difference from a cylindrical bearing point is given by the convex support surface of the bearing point, thereby the low-friction support being provided by interaction with the concave bearing surface on the inertia element.

In another embodiment the conical bearing includes a concave support surface interacting with a convex bearing surface on the inertia element. In this embodiment the conditions of the conical bearing are opposed to the aforedescribed embodiment. The advantages over the cylindrical bearing point are maintained.

Moreover, a belt retractor comprising a belt reel and a locking mechanism according to the invention of the aforementioned type is provided, wherein a bearing pin on which a support surface is provided with which a bearing surface interacts on the inertia element is arranged on the belt reel. Thus a belt retractor is provided which exhibits the advantages of the locking mechanism according to the invention comprising a conical bearing, wherein the support of the inertia element is provided on a bearing pin associated with the belt reel, thereby the support of the inertia element in its center of mass being ensured. Furthermore, this configuration provides an exact association of the belt reel and the inertia element, whereby unnecessary tolerances influencing the inserting behavior can be avoided.

Preferably there is provided a coupling disk provided with an aperture through which the bearing pin extends. This offers the advantage mentioned already before that the locking mechanism comes with a coupling disk. The aperture of the coupling disk which is caught by the belt reel ensures that the inertia element can be supported on the bearing pin arranged on the belt reel.

In a preferred embodiment, the coupling disk is provided with a retaining element for fixing the inertia element to the coupling disk. The retaining element axially fixes the inertia element so that no play will occur and thus the noise behavior will be improved due to the non-existing relative movement.

BRIEF DESCRIPTION OF THE DRAWINGS

Further features and advantages of the invention will become evident from the following description and from the following drawings which are referred to and in which.

DESCRIPTION

Figure 1:
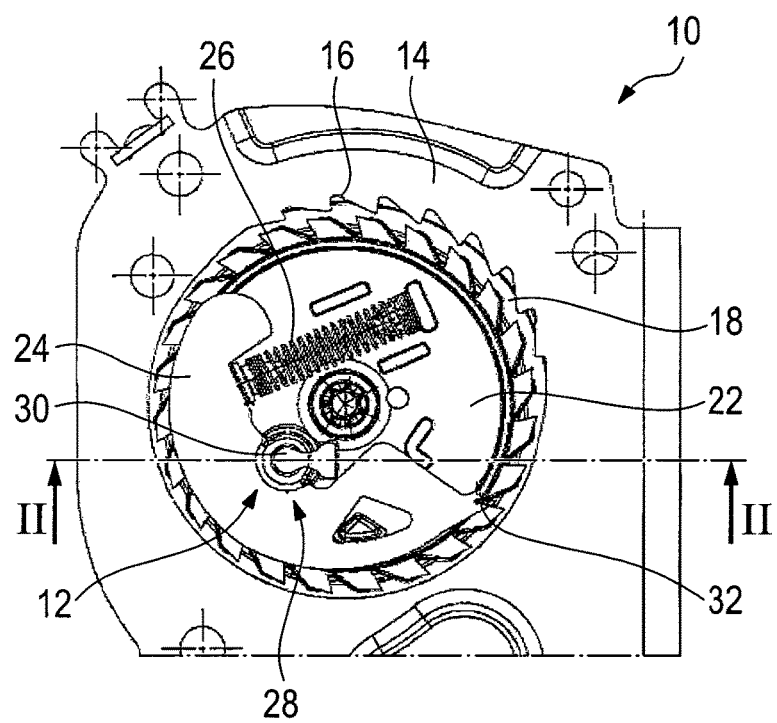
FIG. 1 shows a side view of the locking mechanism according to the invention.

FIG. 1 shows a belt retractor 10 comprising a locking mechanism 12 according to the invention. The belt retractor 10 includes a frame 14 having a toothed area 18. Moreover the belt retractor 10 includes a belt reel 18 whose radial rim includes a toothing 20. In the case of need, the toothing 20 of the belt reel 18 interacts with the toothed area 16 of the frame 14 so as to block the rotational movement of the belt reel 18. In addition, the belt retractor 10 has a coupling disk 22 which is caught by the belt reel 18.

The locking mechanism 12 includes an inertia element 24 which is coupled to the coupling disk 22 while being rotatably biased via a spring 26. The inertia element 24 is moreover supported on a bearing 28. A resilient retaining element 30, also referred to as spring element, is provided for stabilizing the support of the inertia element 24 in the bearing 28. The inertia element 24 further includes a ratchet 32.

Figure 2:
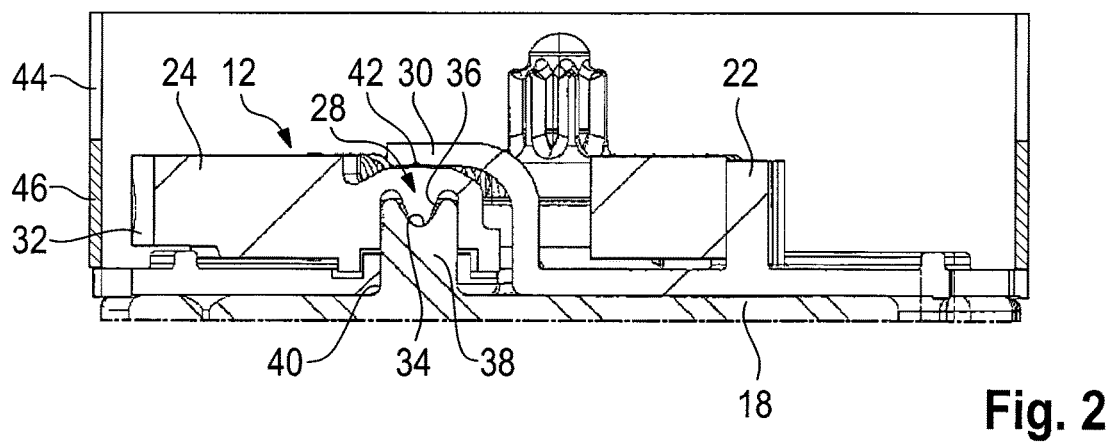
FIG. 2 shows a sectional view of the locking mechanism according to the invention along the line II-II from FIG. 1.

The bearing 28 of the docking mechanism 12 according to the invention to which the inertia element 24 is pivoted is shown in detail in FIG. 2 in a sectional view along the line II-II of FIG. 1. The bearing 28 is in the form of a conical bearing and, in the embodiment illustrated here, consists of a concave support surface 34 and a convex bearing surface 36 at the inertia element 24. The conical bearing 28 is formed so that a point-shaped contact is formed between the support surface 34 and the bearing surface 36.

In the preferred embodiment shown here the spring element 30 is configured integrally with the coupling disk 22. Moreover, the conical bearing 28 includes a bearing pin 38 whose side facing the inertia element 24 corresponds to the support surface 34. This ensures that the inertia element 24 is axially supported in its center of mass. The bearing pin 38 is part of the belt reel 18, thereby tolerances as regards the structure influencing the inserting behavior being avoided. In order to realize the locking mechanism 12 in a belt reel 18 including the bearing pin 38 the existing coupling disk 22 includes an aperture 40 through which the bearing pin 38 extends.

The spring element 30 loads the inertia element 24 against the support surface 34 of the conical bearing 28 so that no axial play occurs between the inertia element 24 and the support surface 34. Hence the spring element 30 has a stabilizing and, resp., retaining effect, which is why it can also be referred to as retaining element. In the shown embodiment the spring element 30 is formed integrally with the coupling disk 22. In this way, again possible tolerances adversely affecting the insertion of the belt reel 18 are avoided.

A pressing surface 42 between the spring element 30 and the inertia element 24 is equally point-shaped, thereby, similarly to the conical bearing 28, a type of conical bearing being formed between the inertia element 24 and the spring element 30, as is evident from FIG. 2.

In addition, FIG. 2 shows a cap 44 of the belt retractor 10 having a toothed area 46 which interacts with the ratchet 32 of the inertia element 24 in the case of need.

Alternative embodiments of the locking mechanism 12 according to the invention can exhibit a conical bearing 28 including a convex support surface 34 and a concave bearing surface 36. Those embodiments are not illustrated in the Figures, but are easily reproducible based on the Figures.

Figure 3:
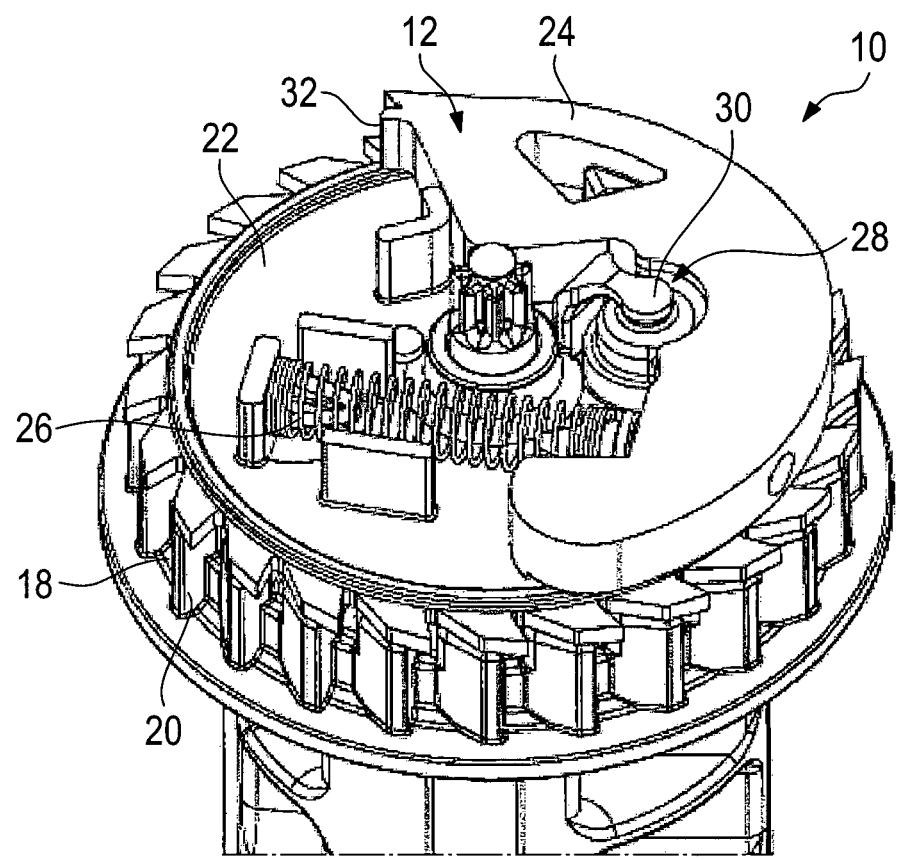
FIG. 3 shows a perspective view of the locking mechanism according to the invention for a belt retractor.

By way of FIG. 3 the principle of the locking mechanism 12 according to the invention is illustrated.

The inertia element 24 is axially held by the spring element 30 and is supported in a low-friction and centric manner via the conical bearing 28.

In the case of need, for example with a strong extension of the webbing, the inertia element 24 is deflected, due to its mass, about the conical bearing 28 against the spring force of the spring 26, thereby the ratchet 32 engaging in the toothed area 46 of the cap 44 of the belt retractor 10 which is shown in FIG. 2. The inertia element 24 is thus connected to the cap 44 in a rotationally fixed manner. Upon further action of force in the direction of extension, the belt reel 16 is inserted into the toothed area 16 of the frame 14 (not shown) and is adjacent in a rotationally fixed manner. Thus the extension of the seat belt from the belt retractor 10 is restricted. The locking mechanism 12 thus has locked the belt retractor 10.

By the configuration of the bearing 28 of the inertia element 24 as a conical bearing in accordance with the present invention reliable insertion of the belt reel 18 is guaranteed independently of the position and the mass of the inertia element 24.

The belt retractor 10 can also be locked in the case of strong deceleration of the vehicle. A vehicle-sensitive sensor (not shown) registers strong deceleration. Thus a ratchet which does not correspond to that of the inertia element 24 and is not shown here engages in the toothing 20 of the belt reel 18. If the deceleration is continued, the belt reel 18 is inserted into the toothed area 16 of the frame 14 and the belt retractor 10 is locked as in the afore-described process.

The invention claimed is:

1. A locking mechanism (12) for a belt retractor (10) comprising an inertia element (24) which is pivoted between a home position and a locked position in a bearing (28), wherein the bearing (28) is a conical bearing, the conical bearing including at least one of a convex support surface interacting with a concave bearing surface on the inertia element and a concave support surface interacting with a convex bearing surface on the inertia element.

2. The locking mechanism (12) according to claim 1, wherein a spring element (30) which loads an inertia element (24) against a support surface (34) is provided.

3. The locking mechanism (12) according to claim 2, wherein there is provided a coupling disk (22) on which the spring element (30) is provided.

4. The locking mechanism (12) according to claim 3, wherein the spring element (30) is formed integrally with the coupling disk (22).

5. The locking mechanism (12) according to claim 2, wherein a point-shaped pressing surface (42) is provided between the inertia element (24) and the spring element (30).

6. The locking mechanism (12) according to claim 1, wherein the bearing (28) supports the inertia element (24) at the center of mass of the inertia element (24).

7. The locking mechanism (12) according to claim 1, wherein the conical bearing (28) includes a bearing pin (38).

8. The locking mechanism (12) according to claim 1, wherein the conical bearing (28) includes a convex support surface (34) interacting with a concave bearing surface (36) on the inertia element (24).

9. The locking mechanism (12) according to claim 1, wherein the conical bearing (28) includes a concave support surface (34) interacting with a convex bearing surface (36) on the inertia element (24).

10. A belt retractor (10) comprising a belt reel (18) and a locking mechanism (12) according to claim 1, wherein a bearing pin (38) on which a support surface (34) is provided with which a bearing surface (36) interacts at the inertia element (24) is provided at the belt reel (18).

11. The belt retractor (10) according to claim 10, wherein there is provided a coupling disk (22) which is provided with an aperture (40) through which the bearing pin (38) extends.

12. The belt retractor (10) according to claim 11, wherein the coupling disk (22) is provided with a retaining element (30) fixing the inertia element (24) to the coupling disk (22).

13. The locking mechanism according to claim 1 comprising a spring, the spring biasing the inertia element to the home position, the inertia element acting against a force of the spring to pivot to the locked position.

14. The belt retractor according to claim 10 comprising a frame having teeth and toothing on the belt reel, wherein pivoting of the inertia element to the locked position causes the toothing of the belt reel to engage the teeth of the frame upon an exertion of force on the belt reel in a seat belt unwinding direction.

15. The locking mechanism according to claim 1, wherein the inertia element engages a cap in the locked position to block rotation of a belt reel relative to a frame, the inertia element being disengaged from the cap in the home position to allow rotation of the belt reel relative to the frame.

* * * * *